(12) United States Patent
Manaugh

(10) Patent No.: US 8,097,218 B1
(45) Date of Patent: Jan. 17, 2012

(54) SYSTEM FOR GENERATING ELECTRICITY FROM ALTERNATIVE ENERGY SOURCES LOCATED ON A FLOATING PLATFORM

(76) Inventor: Thomas Manaugh, Dallas, TX (US)

( * ) Notice: Subject to any disclaimer, the term of this patent is extended or adjusted under 35 U.S.C. 154(b) by 0 days.

(21) Appl. No.: 12/561,559

(22) Filed: Sep. 17, 2009

Related U.S. Application Data

(60) Provisional application No. 61/097,820, filed on Sep. 17, 2008, provisional application No. 61/151,888, filed on Feb. 12, 2009.

(51) Int. Cl.
*B01J 8/00* (2006.01)
*E04D 13/18* (2006.01)
*F24J 2/08* (2006.01)
*H02N 6/00* (2006.01)

(52) U.S. Cl. ........ 422/187; 126/628; 126/609; 126/684; 136/246; 136/251

(58) Field of Classification Search .................. 422/187; 126/628, 609, 684; 136/246, 251
See application file for complete search history.

(56) References Cited

U.S. PATENT DOCUMENTS

| | | | |
|---|---|---|---|
| 3,986,787 A | 10/1976 | Mouton et al. | |
| 4,104,883 A | 8/1978 | Naef | |
| 4,159,427 A * | 6/1979 | Wiedemann | 290/55 |
| 4,316,361 A * | 2/1982 | Hoar | 60/398 |
| 4,335,093 A * | 6/1982 | Salomon | 423/644 |
| 4,495,424 A * | 1/1985 | Jost | 290/53 |
| 4,553,037 A * | 11/1985 | Veazey | 290/55 |
| 4,970,404 A | 11/1990 | Barger | |
| 4,984,534 A * | 1/1991 | Ito et al. | 118/723 MW |
| 6,515,217 B1 | 2/2003 | Aylaian | |
| 6,791,205 B2 | 9/2004 | Woodbridge | |
| 6,791,206 B1 * | 9/2004 | Woodbridge | 290/53 |
| 6,840,738 B1 * | 1/2005 | Swanberg | 416/17 |
| 7,075,189 B2 * | 7/2006 | Heronemus et al. | 290/44 |
| 7,146,918 B2 * | 12/2006 | Meller | 114/39.26 |
| 2005/0011770 A1 * | 1/2005 | Katsuyoshi et al. | 205/742 |

* cited by examiner

*Primary Examiner* — Walter D Griffin
*Assistant Examiner* — Huy-Tram Nguyen
(74) *Attorney, Agent, or Firm* — Michael Diaz

(57) ABSTRACT

A system for generating electricity. The system includes a platform having a top surface. The platform floats on a body of water and includes a plurality of energy modules. Each energy module produces electricity from a different source of energy and is affixed to the platform. Each module contributes produced electricity to the system for storage and distribution. Modules may include wind turbines for generating electricity from wind, water-driven generators for generating electricity from water currents, solar panels for generating electricity from solar energy, an apparatus which floats on water and converts kinetic energy of wave movements into electricity, and an apparatus which extends below the water where the platform is located upon and generates electricity from differences in water temperature at various levels of water depth. An apparatus may be mounted on the platform which produces hydrogen and oxygen gases through a process of electrolysis.

10 Claims, 3 Drawing Sheets

SYSTEM FOR GENERATING ELECTRICITY FROM ALTERNATIVE ENERGY SOURCES LOCATED ON A FLOATING PLATFORM

RELATED APPLICATIONS

This utility application claims the benefit of U.S. Provisional Patent Application Ser. No. 61/097,820 filed Sep. 17, 2008 by Thomas Manaugh and U.S. Provisional Patent Application Ser. No. 61/151,888 filed Feb. 12, 2009 by Thomas Manaugh, which is hereby incorporated by reference.

BACKGROUND OF THE INVENTION

1. Field of the Invention

This invention relates to energy generation devices. Specifically, and not by way of limitation, the present invention relates to a system for generating electricity from alternate energy sources on a floating platform.

2. Description of the Related Art

In the past several hundred years, an increase in human population and a corresponding increase in the use of carbon-based fossil fuels, such as coal, oil, and natural gas, have set in motion a process of global warming. Higher global temperatures result from the Earth's inability to rid itself of excess heat.

Radiant energy comes from the sun through space to heat the Earth. Historically, the Earth has not become too hot for life because Earth re-radiates energy back into space, thereby keeping its temperature moderate. However, this is changing with the increased use of carbon-based fossil fuels. The average temperature is now increasing in the air, oceans and upon land, resulting in devastating effects on the planet's ability to support life. The Earth is presently in a process of mass extinction of thousands of species of life every year.

Using fossil fuels for energy represents only a small fraction of what warms the planet, less than one percent. However, burning such fuels has changed the atmosphere of the Earth by creating polluting green house gases. These gases trap heat in the atmosphere and cause global warming.

No near-term solution to the problem of global warming is known. Green house gases continue to be generated at a high rate, and temperatures will continue to rise on Earth for at least decades, even if use of all fossil fuels were halted today. Maintaining a benign environment for humans and other species to survive on Earth depends on replacing the burning of fossil fuels with alternative energy sources.

Devices in the past have been proposed that are able to extract energy from sources in an ocean environment where the sources of energy do not involve the burning of fossil fuels. However, there is currently no existing proposal providing a very large, movable, floating support structure that provides for stability and safety even when climatic conditions are at their worst and can accommodate a plurality of energy sources for the production of clean energy.

Thus, it would be advantageous to have a system and method providing a floating platform to accommodate several alternative energy sources. It is an object of the present invention to provide such a system.

SUMMARY OF THE INVENTION

The present invention addresses the problem of global warming while providing a system for generating energy from several different energy sources. In one aspect of the present invention, the present invention is directed to a system for generating electricity. The system includes a platform having a top surface. The platform floats on a body of water and includes a plurality of energy modules. Each energy module produces energy from a different source of energy and is affixed to the platform. Each energy module contributes produced electricity to the system for storage and distribution. Energy modules may include wind turbines for generating electricity from wind, water-driven generators for generating electricity from water currents, solar panels for generating electricity from solar energy, an apparatus which floats on water and captures kinetic energy of wave movements, and an apparatus which extends below the water where the platform is located upon and generates electricity from the differences in water temperature at various levels of water depth. In addition, another apparatus which produces hydrogen and oxygen gases through a process of electrolysis may be used.

DESCRIPTION OF THE INVENTION

The present invention is a system for generating electricity from a plurality of energy sources located on a floating platform. The floating platform is an energy island (EI) 1000. The EI 1000 includes a floatable platform structure that provides a mounting support for various energy generation devices utilized on the EI.

In the preferred embodiment of the present invention, the EI remains stationary on a body of water. EI enables water to flow through the EI in such a manner as for the generation of electricity from water currents. Preferably, anchoring chains or other attachment devices are utilized to maintain the EI in a desired orientation and stationary position upon the body of water.

In the preferred embodiment of the present invention, the dimensions of the EI are sufficiently large enough to provide a significant effect on global warming. It is estimated that a square surface that is less than 100 miles on each side receives more energy from solar radiation than all the energy that is used by humans for heating, lighting, cooling, transportation, manufacturing, etc. Therefore, one very large EI, or a plurality of smaller EIs, may be utilized in a way to capture solar-based energy on a scale large enough to replace all use of fossil fuels for energy uses.

Because the EI is designed to float on large bodies of water, the EI is preferably large and rugged enough to operate even when waters are rough. It should be understood to those skilled in the art that, without going beyond the scope of the present invention, the EI may be of any dimension that enables the various energy generation devices to be supported upon the EI. Construction and operation of very large floating structures have been demonstrated in the past to be feasible and serve as a practical base for effecting complicated mechanical tasks. For example, a floating airport was constructed in Tokyo Bay in 1999 where a runway was 1000 meters long. Planes were able to land safely on the runway. The structure of the EI is preferably greater than 1000 meters in length and 300 meters in width for operation on the ocean. Smaller EIs may be employed on lakes or rivers.

Aircraft carriers are very large ships that can safely travel on the roughest seas. The length of an aircraft carrier is less than one-third the minimum length suggested for the EI. For example, the U.S. aircraft carrier Ronald Reagan is 1,092 feet and is 134 feet wide. Thus, a large floating platform is able to remain stable on the open ocean if it is no smaller than three times longer and wider than an aircraft carrier. Thus, a platform of such dimensions is adequately stable and safe even in rough seas.

Figure 1:
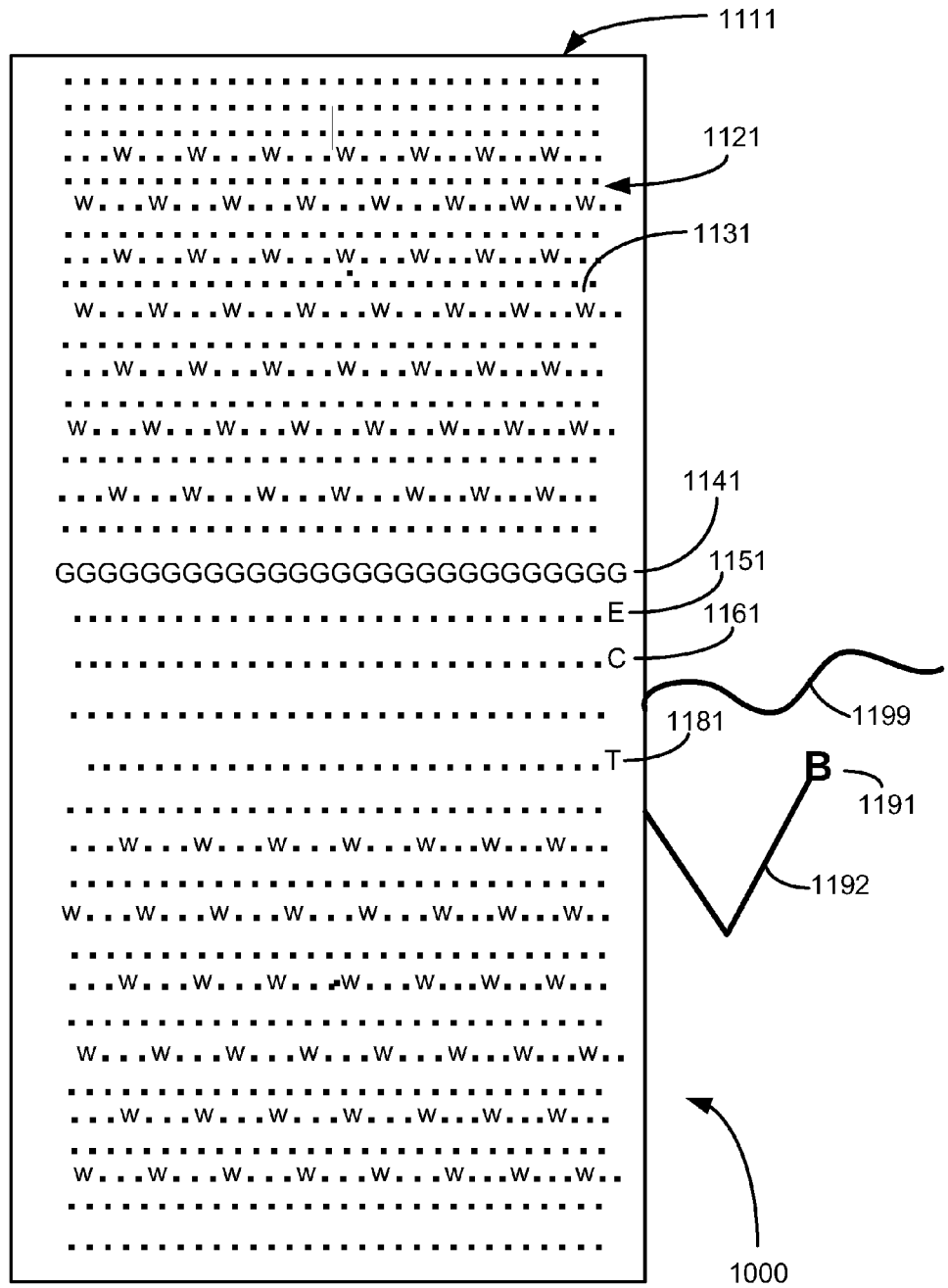
FIG. 1 is a top schematic representation illustration of various components of the Energy Island in the preferred embodiment of the present invention.

FIG. 1 is a top schematic representation illustration of various components of the EI 1000 in the preferred embodiment of the present invention. The EI includes a top surface 1111. The EI employs a plurality of energy generation modules. Each module provides a different process for generating electricity. For one type of module, a plurality of photovoltaic cells 1121 may be used. Each dot on the top surface represents a center point of the plurality of photovoltaic cells 1121. Another energy module may include a plurality of wind turbines 1131 in a wind farm depicted as a "W". Large wind turbines generate electricity from wind blowing across the top panel. Still another energy module may be generators 1141 driven by water flowing under the top surface 1111 of the EI and is depicted by a "G" on the top surface. The EI may also employ an energy module which utilizes electrolysis to convert water into hydrogen and oxygen gases at 1151 and is depicted by an "E". "C" represents an area where hydrogen and oxygen gases are stored in containers 1161. "T" represents the above-water location of equipment 1181 that effects ocean thermal energy conversion (OTEC) by making use of differences in temperature between various layers of water in another energy module which may be employed by the EI. In another energy module which may be utilized by the EI, wave generators 1191 may be used. "B," placed to the side of the top panel, represents the location where many bobbing wave generators 1191 are deployed in the water near to the top surface and are linked to the panel by electrical wires 1192. Other wires are shown 1199 for use in transmission of electricity and in communications to and from remote locations.

Figure 2:
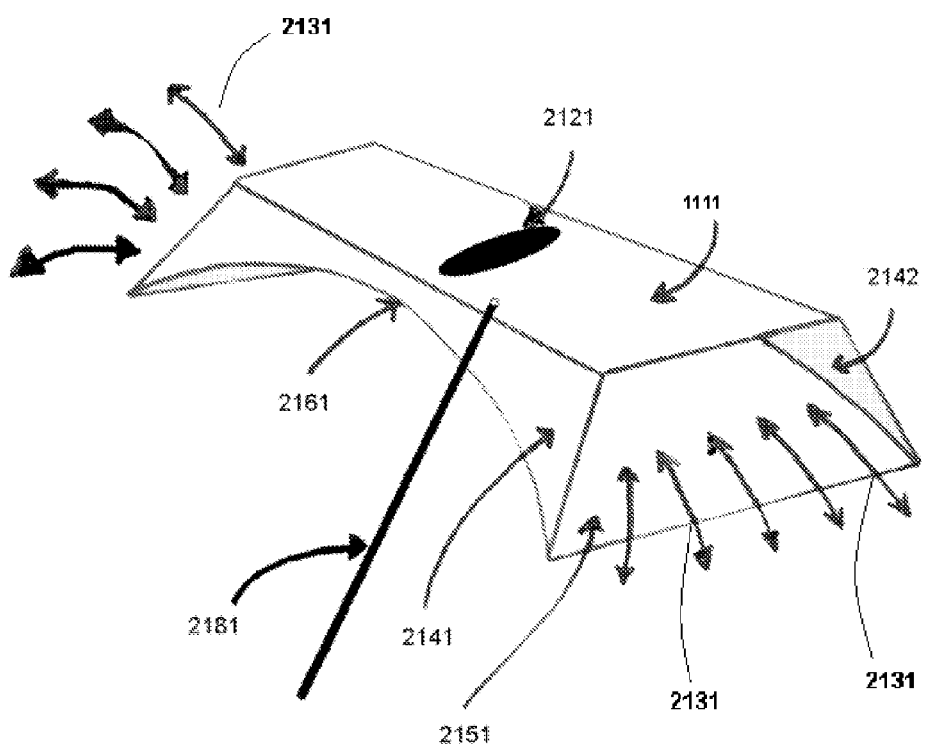
FIG. 2 is a side perspective view of the EI of FIG. 1.

FIG. 2 is a side perspective view of the EI of FIG. 1. The top surface 1111 of the platform is where most of EI's mechanical and electrical devices are located. Specific locations for the devices are not shown with the exception of location 2121 which illustrates the location for turbines and generators that are driven by ocean currents 2131 that flow beneath the top of the floating platform. Other elements shown are side panels of the platform 2141 and 2142 and a bottom panel 2151. The panels 2141, 2142, and 2151 are configured so that the ocean currents 2131 are directed toward the top of the platform, where water turbines intercept the current to generate electricity. Narrowing of the path of the water at the location where the top and bottom panels are closest in proximity 2161 concentrates the force of the current that is intercepted by the water turbines located at 2121. Internal to the panels are structural elements that comprise air-filled hollow chambers to provide buoyancy to the platform. The chambers may be constructed of very lightweight materials. A pipe 2181 is shown that may bring cold water from lower depths of the ocean for use in ocean thermal energy conversion (OTEC).

Figure 3:
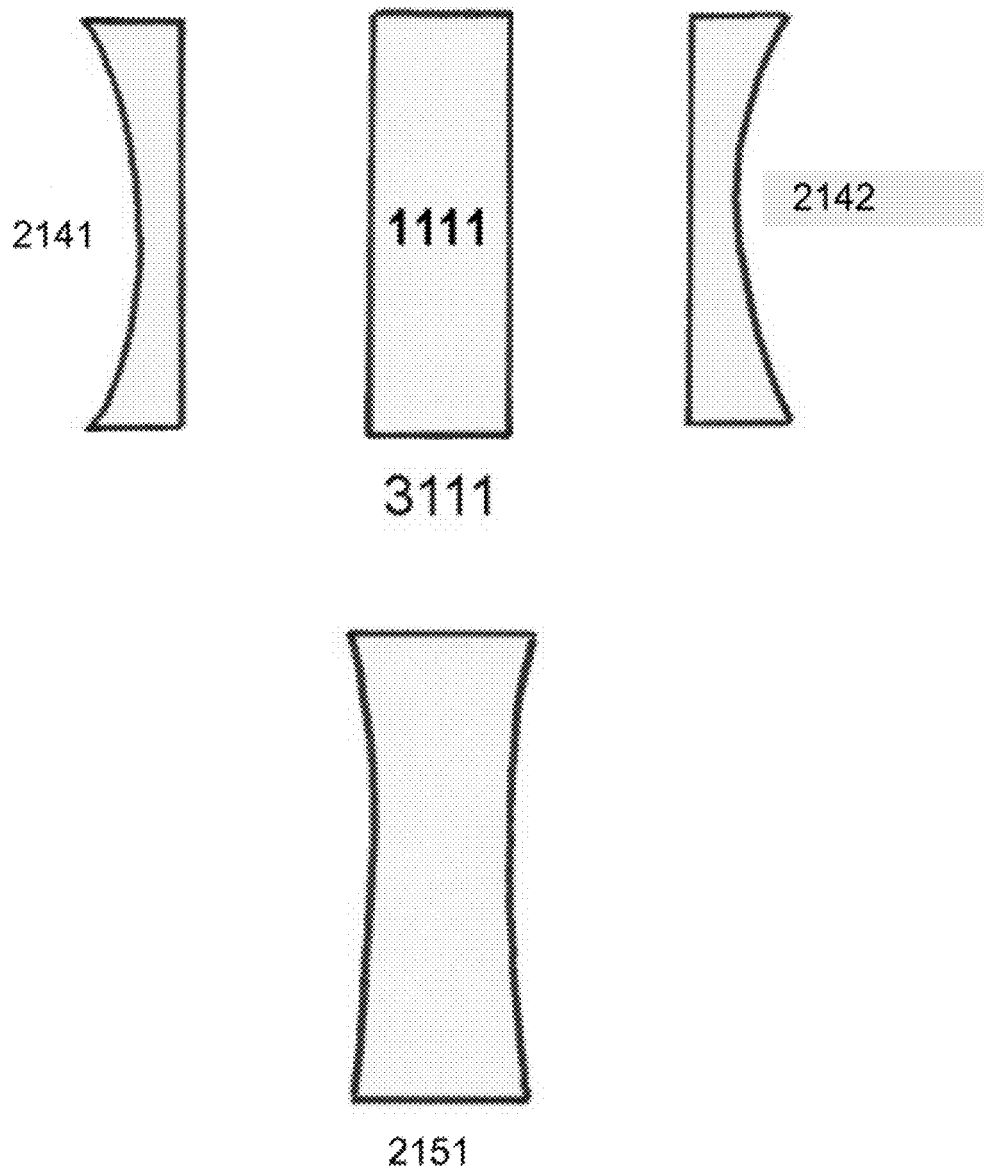
FIG. 3 is a top view of structural components of the Energy Island of FIG. 1.

FIG. 3 is a top view of structural components of the EI 1000 of FIG. 1. The components include a top panel 3111 having the top surface 1111, the side panels 2141 and 2142 and the bottom panel 2151. The present invention may utilize existing devices for employing energy generation modules.

In one embodiment, electricity may be generated by using water-driven turbines mounted on the EI 1000. Currents of water, flowing through a duct formed by EI's panels 3111, 2141, 2142, and 2151, drive turbines that generate electricity at generators 1141. Construction of water turbines that are used in production of electricity is described in detail in U.S. Patent Application Publication Number 2009/0134623 to Krouse (Krouse). Krouse is hereby incorporated by reference herein. Krouse discloses the use of turbines for the generation of electricity. In Krouse, water moves through a turbine section which drives a turbine blade which generates rotational mechanical power to a gearbox. The gearbox drives a shaft connected to a hydraulic pump for the creation of high pressure hydraulic fluid. A valve transfers high pressure hydraulic fluid through other valves which are connected via a high pressure hydraulic fluid manifold to a hydraulic motor for further conversion of power from high pressure fluid to a generator to generate electricity. The hydraulic pump and valves are positioned on a platform which floats on the surface of the body of water that provides the water power. Krouse further discloses a single turbine and hydraulic pump which may provide hydraulic power to the hydraulic motor and then to the generator. Such a generation system may be utilized as a type of energy module on the EI 1000.

In U.S. Pat. No. 3,986,787 to Mouton et al. (Mouton), Mouton discloses a water turbine which is positioned on a floating platform and intercepts water currents. Mouton is hereby incorporated by reference herein. Mouton discloses a channel of water which is created by inner surfaces of ductwork in a manner to converge a water current at an intercepting turbine and then expanding the channel downstream from the turbine and applying principles of hydraulics by using outer surfaces of the ductwork to facilitate discharge of the channel of water in flared ducts that diminish back pressure downstream from the turbine. Such ductwork may be employed in the EI for a water-driven turbine for extracting energy from water currents.

The EI 1000 may employ an energy module which generates electricity from wind-driven turbines. Wind that blows across EI may be used to drive wind turbines that generate electricity as depicted in the plurality of wind turbines 1131 in FIG. 1. U.S. Pat. No. 4,970,404 to Barger (Barger) discloses a wind turbine that revolves in a vertical plane. Barger is hereby incorporated by reference herein. EI may utilize the wind turbines disclosed in Barger. A further advantage of utilizing the wind turbine of Barger is that vertical rotation wind turbines produce electricity regardless of the direction from which wind blows.

The EI may also employ another type of energy module which generates electricity from devices which capture kinetic energy from wave action on a body of water. The EI may employ devices which bob in the water to generate electricity. In particular, these bobbing devices may generate electricity from fluctuating electromagnetic fields inside the devices as depicted at 1121 in FIG. 1. U.S. Pat. No. 6,791,205 to Woodbridge (Woodbridge) discloses a reciprocating generator power buoy which generates electric power from the surface ocean swells. Woodbridge is hereby incorporated by reference herein. Woodbridge discloses damping plates attached to a generator coil which maintains the coil in a stable position as the generator's magnetic housing, solidly connected to the underside of an ocean buoy, and reciprocates up and down with the passing ocean swells. Woodbridge discloses that the rocking motion of the buoy is inhibited and allows only vertical up and down motion. The magnetic housing focuses a magnetic field through the generator coil and creates an electromotive force in the coil from the relative motion between the coil and the magnetic housing. The devices disclosed in Woodbridge may be utilized in the EI 1000.

The EI may also utilize photovoltaic cells for the generation of electricity. Solar photovoltaic cells 1121 may be arrayed across the top surface of EI to produce electricity. The use of solar cells in production of electricity is well known and may be utilized in the present invention. U.S. Pat. No. 6,515,217 to Aylaian discloses such solar cells useable in the EI 1000 and is hereby incorporated by reference herein. Aylaian discloses a solar collector which includes a three-dimensional array of cells, including a base-layer and at least one elevated-tier above and separated from the base-layer, so that at least some light passes between cells of the tier to the base-layer. Aylaian further discloses that the tier includes cells which are oriented to receive light reflected from the base-layer. With the large surface area available on the EI, the arrangement of cells may be easily accommodated on the EI 1000.

The EI 1000 may also utilize an energy module which employs devices which generate electricity from differences in temperature between layers of water. The EI may utilize differences in temperature between layers of ocean water to generate electricity as depicted at 1151 in FIG. 1. This source of energy is potentially of great import because huge amounts of radiant energy are captured in the upper, warmer layers of oceans. Since oceans cover more than 70 percent of Earth's surface, this energy module may be used to produce a considerable amount of energy. U.S. Pat. No. 4,104,883 to Naef (Naef) discloses a device to produce electricity from differences in the temperatures of ocean layers. Naef is hereby incorporated by reference herein. Naef disclose that OTEC uses a fluid, such as ammonia, heated by high-temperature surface water to provide a turbine-driving working gas. To condense the gas for re-use, a slurry of phase-transformation particles and cold ambient sea water is mixed in a deeply-submerged tank and delivered to a surface tank essentially at the cold sub-surface temperature. The working gas is condensed by exposure to the cold slurry temperature. Particle phase-transformation, which occurs at a temperature between that of the cold sub-surface water and the reject temperature of the heat-exchanger, maintains a surface tank temperature at about the sub-surface water. The OTEC system disclosed in Naef may be utilized for generating energy in the EI 1000.

EI may be used to produce electricity by means of using differences in water temperature between different layers of water. Generally, energy can be extracted from upper, warmer layers of ocean water when gas in a closed system, first, is pressurized and cooled into a liquid (condensed) by cold water but then, second, is allowed to expand and drive a turbine when warmed in said warmer water. Cold water becomes warmer in the process of condensation of the gas while warm water becomes colder during expansion of the gas. In another embodiment of the present invention, the process discussed above whereby cold water is warmed may be reversed. Using electricity to refrigerate relatively warm upper-layer water would result in producing colder and denser water. This colder denser water would tend to sink. The pipe 2181 illustrated in FIG. 2 may be used to deliver refrigerated water (near freezing) to lower depths. Using refrigeration to cool water is a process well known to those skilled in the art.

That unusual application of EI, to refrigerate seawater, could be used to slow melting of glaciers that are quickly melting in West Antarctica. In Antarctica, glaciers rest on bedrock. However, seawater infiltrates under the glaciers to cause rapid melting. Melting of glaciers in Antarctica, which contains 70% of the Earth's frozen fresh water, will cause sea levels around the world to rise over 200 feet. Electricity generated by various alternative sources of energy (e.g., wind, wave, and solar) to refrigerate water may be delivered to strategic areas off the western coast of Antarctica for retarding the rate at which glaciers are melting. That effect could be very important for human population centers, thereby allowing the population centers sufficient time to adjust to rising sea levels.

As discussed above, electricity produced on EI can be used in a process of electrolysis to split water into hydrogen and oxygen gases that can be stored for later use. The process of electrolysis and storage is well known to one skilled in the art and that process constitutes a storage system for energy, given that means are well known for re-combining hydrogen and oxygen to produce heat or electricity. In another embodiment of the present invention, hydrogen gas that is generated by electrolysis may be utilized. Specifically, electricity is used to provide heat and pressure in a chemical reaction that also involves hydrogen from electrolysis and carbon dioxide from normal, filtered air. The chemical reaction is:

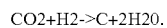

$$CO_2 + H_2 \rightarrow C + 2H_2O.$$

The reaction combines carbon dioxide (a greenhouse gas) and hydrogen gas into harmless soot and water vapor. The reaction would need heat energy to occur, and it would work most efficiently with a catalyst present (e.g., Raney nickel, a relatively cheap catalyst). The above chemical reaction uses energy and $H_2$ (abundant from EI's operation) to sequester carbon. Because the resulting carbon would be in a very pure form, it could be used, along with additional heat and pressure, to form diamonds. The diamonds may be used as a type of cash crop produced by EI. Additionally, the soot may be a valuable product, given that soot is a material valued for use as a pigment.

The EI may utilize a wide variety of known storage devices for storing generated electrical energy, such as flywheels, batteries, and production of hydrogen and oxygen gases that are stored in containers for later use in producing electricity or heat. Electricity produced on EI may be transmitted to remote areas for use or storage. Some electricity may be consumed in powering operations on EI.

The present invention may use one or more of the modules for generating electricity. Furthermore, the present invention is not limited to the size, configuration and type of modules described herein. The present invention may utilize other modules to generate electric and still remain in the scope of the present invention. Additionally, although the EI is preferably located on a body of water, in another embodiment, the EI may be located on land.

In another embodiment, hydrogen gas may be the energy source of choice. Hydrogen gas can be produced by electricity through electrolysis. Production of hydrogen gas by electrolysis can be efficiently achieved because of recent advances in catalytic methods of electrolysis. Therefore, electricity produced by the present invention may be used to replace the use of fossil fuels not only for purposes of electricity generation but also for other energy uses, including production of hydrogen as a non-polluting replacement for fossil fuels used in transportation and heating.

The present invention provides many advantages to existing energy generating devices. The present invention provides a stable large platform located on a body of water which can utilize several sources of energy to generate electricity. By locating the platform on the water, the present invention may utilize several sources of energy not available on land. The present invention is a system that integrates a plurality of energy modules that each contributes to generation of electricity but preferably does not involve the burning of fossil fuels. Large amounts of electricity are produced, thus allowing a great reduction in burning of fossil fuels. The resulting reduction in generation of green house gases will reduce the amount of global warming that would otherwise occur.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for generating electricity, the system comprising:
    a platform capable of floating on a body of water, the platform having a top panel, a first side panel, a second side panel, and a bottom panel that restrict water flow through a narrowing duct formed by the panels as the water flows under the top panel and exits a widening duct formed by the panels;
    a plurality of energy modules, wherein each energy module produces electricity from a different source of energy for storage and distribution and is affixed to the platform;
    wherein one of the plurality of modules is a module employing at least one water-driven turbine that generates electricity when a current of water flows through the duct located below the top panel of the platform, thereby causing the turbine to turn and produce electricity.

2. The system according to claim 1 wherein one of the plurality of modules is a module having at least one device that is attached by wires to the apparatus and floats in the water and generates electricity from kinetic energy of wave movements.

3. The system according to claim 1 wherein one of the plurality of modules is a module employing at least one panel of solar photovoltaic cells that produces electricity when solar radiation falls on the cells.

4. The system according to claim 1 wherein one of the plurality of modules is a module having at least one wind-driven, electricity-generating turbine that is mounted on the top panel of the platform.

5. The system according to claim 1 wherein one of the plurality of modules is a module that includes a device that extends below the water where the platform is located upon and utilizes a means for generating electricity from differences in water temperature at various levels of water depth.

6. The system according to claim 1 wherein at least one of the plurality of modules utilizes electricity to power a means for refrigerating water,
    whereby water cooled from the means for refrigerating water is delivered to an area below the body of water in which the platform floats.

7. The system of claim 1 further comprising a device mounted on the platform that utilizes electrolysis for producing hydrogen and oxygen gases.

8. The system according to claim 7 further comprising means for storing hydrogen and oxygen gases.

9. The system according to claim 7 further comprising means for sequestering carbon dioxide from air by reacting it with hydrogen gas to produce soot and water vapor.

10. The system according to claim 9 further comprising means for using heat and pressure to convert soot into diamonds.

* * * * *